United States Patent [19]

Anton et al.

[11] Patent Number: 4,720,475

[45] Date of Patent: Jan. 19, 1988

[54] SILICA-PARTICLES CONTAINING ALUMINA, PROCESS FOR PREPARING SAME AND THE USE THEREOF

[75] Inventors: Octavian Anton, Brussels; Dirk Van Wouwe, Tisselt; Georges Poncelet, Beauvechain; Pierre Jacobs, Gooik; Johan Martens, Brussels, all of Belgium

[73] Assignee: Redco N.V., Kapelle-op-den Bos, Fed. Rep. of Germany

[21] Appl. No.: 920,663

[22] Filed: Oct. 20, 1986

[30] Foreign Application Priority Data

Oct. 29, 1985 [DE] Fed. Rep. of Germany ....... 3538377

[51] Int. Cl.$^4$ .............................................. B01J 21/12
[52] U.S. Cl. .................................. 502/250; 423/338; 423/339; 502/237; 502/238; 502/235; 585/510; 585/530; 208/106; 208/111; 208/120
[58] Field of Search ............... 502/250, 237, 238, 235; 423/339, 327

[56] References Cited

U.S. PATENT DOCUMENTS

| 2,456,268 | 12/1948 | Gibbs et al. ......................... 502/238 |
| 3,650,989 | 3/1972 | Hindin et al. ....................... 502/238 |

FOREIGN PATENT DOCUMENTS

| 0159578 | 10/1985 | European Pat. Off. . |
| 4039758 | 10/1974 | Japan .................................... 502/238 |
| 1511125 | 5/1978 | United Kingdom ................ 502/250 |
| 2100710 | 1/1983 | United Kingdom ................ 502/238 |

Primary Examiner—Asok Pal
Attorney, Agent, or Firm—Wegner & Bretschneider

[57] ABSTRACT

Amorphous, substantially spherical silica particles obtained by acidic hydrolysis of substantially spherical synthetic crystalline calcium silicates having a size of from 20 to 120 microns are coated with a layer comprising silica and alumina. The silica particles obtained may be directly employed as catalysts for the oligomerization of olefins and, having been loaded with platinum, as hydrocracking catalysts.

7 Claims, No Drawings

SILICA-PARTICLES CONTAINING ALUMINA, PROCESS FOR PREPARING SAME AND THE USE THEREOF

The present invention relates to amorphous approximately spherical silica particles obtained by the acidic hydrolysis of approximately spherical synthetic crystalline calcium silicates having a size of from 20 to 120 microns, to a process for preparing same and to the use thereof, more specifically as catalysts for petrochemical reactions.

Amorphous silica particles may be prepared by a variety of methods. They are used for many purposes and as carriers for catalysts. The preparation in general is effected by neutralization of aqueous solutions of sodium silicates using inorganic acids such as hydrochloric or sulfuric acids. The precipitates are washed and dried. Examples for such preparation procedures are described in U.S. Pat. Nos. 2,114,123 and 1,751,955. Further methods for the preparation of amorphous silica particles utilize hydrolysis or combustion in the gaseous state. These silica products are marketed, for example, under the trade marks of "Aerosil" or "Spherosil" or "Cabosil" or "Xerosil". These amorphous silica particles in general are of irregular or spherical shape and have various particle sizes depending on the process of preparation and further processing. For certain intended uses finely divided silica particles may be formed into larger pellets using suitable binders. In order to activate the silica particles for use as catalyst supports they generally are calcinated.

In the British Patent Specification No. 1,511,125 (corresponding to German Patent Application DE-OS 26 12 281), there have been described amorphous silica particles, molded articles obtained therefrom and processes for preparing same. The silica particles described therein are obtained by hydrolyzing approximately spherical synthetic calcium silicate particles, which are 20 to 120 microns in size, with carbon dioxide in the presence of water and subsequently washing with concentrated hydrochloric acid, whereupon products are obtained which, although they have the outward appearance of the crystalline starting material, consist exclusively of amorphous silica. Thus, in this two-step treatment with acids, the original shape of the starting materials is retained almost unchanged. However, the silica thus obtained has a higher porosity and a higher specific surface area than the original calcium silicate particles. The silica particles thus obtained are suitable for a variety of purposes, inter alia as catalyst supports.

In European Patent Application No. 85 103 873 there have been proposed amorphous, approximately spherical silica particles obtained by acidic hydrolysis of approximately spherical calcium silicates of 20 to 120 microns in size, said silica particles obtained having an average outer particle size of from 15 to 80 microns and a specific surface area of from 250 to 800 m²/g. In said Patent Application it has further been proposed to use the silica thus obtained as supports for metal catalysts comprising one or more metals of the Groups Ib, IIb, IIIb, IVb, Vb, VIb, VIIb and VIII of the Periodic Table.

Acidic catalysts are known to be useful in petrochemical reactions, e.g., materials formed by impregnating silica with orthophosphoric acid. These catalysts serve, i.a., to oligomerize olefins such as isobutane, in which process mostly dimers, and to a minor extent trimers and tetramers of isobutane are formed.

Hydrocracking of heavy crude oil fractions has gained increasing importance to supply the demand for automotive fuels. For this purpose, silica/alumina catalysts are used such as those, for example, produced and marketed by the firm Kalichemie, Hannover, West Germany. These catalysts are impregnated with platinum and, under the conditions of hydrocracking, yield intermediate molecular weight fractions which may be used as automotive fuels.

It is the object of the present invention to provide acidic catalysts based on amorphous silica particles which can be prepared simply, at low cost and reproducibly and are also suitable for use as catalysts for petrochemical reactions. In such a process it is desirable to make use of substantially spherical synthetic calcium silicates which are from 20 to 120 microns in size and can be prepared reproducibly at reasonable cost, such as those marketed under the designation of "Promaxon" by the firm Promat in Düsseldorf, West Germany.

As the acidic component, alumina should be used if possible, since it is low-priced, and mixed silica/alumina catalysts have been successfully employed for hydrocracking.

Attempts to incorporate the alumina in the calcium silicate at the outset have failed because even traces of aluminum prevent xonotlite formation and, thus, make impossible the preparation of a suitable synthetic calcium silicate.

Quite unexpectedly, the desired object was attained by coating the silica particles obtained from the synthetic calcium silicates with a co-precipitated layer of amorphous silica and amorphous alumina. Oxide hydrates are formed which have no or only minor crystalline constituents and are sometimes referred to as silica-alumina. For this purpose, the calcium silicates are hydrolyzed within the pH range of from 0.6 to 5 at room temperature or somewhat higher or somewhat lower temperature, meaning a temperature range of about 10°–30° C. with an acid which does not form a sparingly soluble calcium salt. There is added to the reaction mixture a reactive aluminum compound and the mixture is allowed to react; the insoluble silica particles are removed, washed with water and dried.

Under these conditions part of the silica dissolved into solution during hydrolysis is co-precipitated by the addition of the aluminum compounds. These freshly deposited precipitates apparently are capable of strongly bonding to the still remaining silica skeleton of the starting substance and, thus, also to bond the aluminum oxide firmly.

The silica particles obtained according to the invention in general contain an atomic ratio of Si:Al of from 5:1 to 35:1, and preferably from 8:1 to 30:1. It is particularly advantageous that they have a high specific surface area. The specific surface area (BET/nitrogen) is desirably from 250 to 800 m²/g, and more particularly from 350 to 600 m²/g.

The silica particles obtained according to the invention may be used as catalysts for the oligomerization of olefins such as isobutane immediately after drying. In said process the dimeric product is formed predominantly and a trimeric reation product is found in only very minor amounts. The formation of tetrameric product is virtually no longer observed. The useful life of the catalysts thus obtained is surprisingly long, so that they have distinct advantages over silica impregnated with phosphoric acids.

The silica particles of the invention may be further impregnated with platinum in a per se known manner and, in hydrocracking heptadecane, already at lower temperatures they yield higher conversion rates than the conventional commercially available catalysts based on silica/alumina. Also these catalysts very specifically result in the formation of medium molecular weight degradation products having very low admixed amounts of $C_1$ and $C_2$ hydrocarbons.

For carrying out the process of the invention for preparing the silica particles, there are employed the known approximately spherical synthetic calcium silicate particles which are 20 to 120 microns in size and predominantly consist of xonotlite and contain only low amounts of tobermorite and/or CSH crystals.

In the reaction, the pH may be varied within the range of from 0.6 to 5 without adversely affecting the formation of the desired final product and its quality. It is preferred to operate at room temperature; however, somewhat elevated or lower temperatures, namely within a temperature range of about 10°-30° C., may also be employed. In practice, there may be used as acids all sufficiently strong inorganic or organic acids which do not form sparingly soluble calcium salts. Acids forming soluble buffers with calcium salts are particularly suitable for automatically adjusting the required pH range.

As the reactive aluminum compounds there may be used virtually any aluminum compound which is capable of being hydrolysed under the indicated conditions and, thus, enabling a co-precipitation with the silicic acid in solution to occur. Typical examples are aluminum alkoxides such as aluminum isopropoxide, but aluminum salts such as aluminum trichloride, sodium aluminate and pseudo-boehmite can also be used.

After the addition of the reactive aluminum compound the reaction is allowed to take place for some time, and then insoluble silica particles may be separated. The particles formed are washed with water until they are free of calcium, and then they are dried, preferably at a temperature between 100° C. and 120° C. After having been dried, they may immediately be used. They have a surprisingly high specific surface area in the range of from 250 to 800 $m^2/g$. In most cases, surface areas of from 400 to 600 $m^2/g$ are formed. Unexpectedly high is also the total yield of silica and alumina. In the subsequent washing step almost no silica and alumina are washed out.

An X-ray diffraction analysis of the products of the invention showed that in the interior they have an amorphous silica structure which morphologically still resembles that of the original crystals of calcium silicate. On the surface, more particularly in the outer portion of the silica particles, there is found an amorphous coating of co-precipitated silica/alumina in the form of oxide hydrates containing no or only slightly crystalline proportions (silica-alumina). Further investigations resulted in the finding that in the same manner reactive compounds of titanium, zirconium, boron, gallium and chromium, which will hydrolyze under the conditions of the invention, may also be precipitated on the freshly formed silica. Apparently there are also formed mixed oxide hydrates of the added metals with silica which after drying have a large and reactive surface. It is expected that silica particles activated with these metals are also suitable as catalysts and may provide better results than catalysts produced by subsequently coating silica with the respective metal oxide hydrates. Such silica particles, processes for preparing same and the use thereof are also included in the scope of the present invention.

The present invention and the products, processes for preparing same and the use thereof are further illustrated by the following non-limiting examples.

REFERENCE EXAMPLE 1

Preparation of the Starting Material:

Burned or slaked lime having a calcium oxide content of 95% and crystalline silica having a purity of 95% $SiO_2$ are mixed in water at a molar ratio of 0.94:1, the suspension having a ratio of water to solids of 11:1. The suspension is stirred in an autoclave at a temperature of about 190° C. After 8 hours, the xonotlite crystals are obtained as a suspension. This suspension is partially dehydrated by filtration. The products thus obtained have the following properties:

| | |
|---|---|
| Morphology | Spherical particles comprising three-dimensionally entangled ("felted") primary crystals |
| Diameter | 20 to 120 microns |
| Specific surface area | 60 $m^2/g$ |
| Surface structure | Irregular network of fine entangled crystals |

EXAMPLE 1

30 g of xonotlite, prepared according to the above Reference Example 1 are dispersed in 450 ml of demineralized water. Into the stirred suspension there are quickly added 33.3 ml of concentrated acetic acid and stirring is continued for 10 minutes. The content of dissolved silicic acid in the solution is 41% of the total amount of silica of the xonotlite employed. 5.38 g of aluminum chloride $\times 6H_2O$, dissolved in 100 ml of demineralized water are then quickly added with stirring.

The solids are collected by filtration, washed with distilled water until free of calcium and dried at 110° C. The resulting powder of alumina containing silica particles has the following properties:

The substantially spherical particles to some degree have a pseudomorphic structure corresponding to that of the originally employed xonotlite particles, especially inside the spherules. The specific surface area (BET/nitrogen) is 494 $m^2/g$. The Si/Al atomic ratio is 15.

EXAMPLE 2

30 g of xonotlite, prepared according to the above Reference Example 1, are dispersed in 350 ml of demineralized water. With stirring there is slowly added hydrochloric acid until the pH is constant at 0.78. The content of silicic acid in the solution is 29% of the total silica content of the xonotlite employed. 2.74 g of sodium aluminate are dissolved in 50 ml of demineralized water and then quickly added to the suspension with stirring. Then the pH is adjusted to 3.50 with 5N hydrochloric acid. The slurry thus obtained is stirred for 4 hours. The solids are filtered off, washed until free of calcium and dried at 110° C. The product thus obtained, comprising silica particles having an alumina content, has an appearance similar to that of Example 1. The Si/Al atomic ratio is 10. The specific surface area (BET/nitrogen) is 410 $m^2/g$.

EXAMPLE 3

The product of Example 1 is granulated and charged into a fixed bed reactor. The amount of catalyst is 1000 mg and the pressure in the reactor is 1 bar. Isobutene, diluted with nitrogen and having a partial pressure 168.9 mbar (126.67 mmHg), is passed therethrough at a flow rate of 30 ml/min. For the purpose of comparison, the same amount of a conventional catalyst was employed which had been prepared by impregnating commercially available silica with an 85% orthophosphoric acid solution. Said product after impregnation had been dried at 110° C. and calcinated at 200° C. for 2 hours.

The reaction temperature with the catalyst of the invention was 157° C. and the WHSV value was 2.0/h. With the catalyst of the invention the initial conversion was 30% and was reduced to 15% after 27 g of isobutene had been converted. The conversion further decreased to 10% after 108 g of isobutene per 1 g of catalyst had been converted. With the comparative catalyst, the initial conversion was 60% which decreased to 22% after 22.5 g of isobutene per 1 g of catalyst had been converted. The product selectivity changed with time on stream (TOS) as illustrated by the following Table:

TABLE I

| Catalyst | TOS (g/g) | $C_3$ | $C_5$-$C_7$ | $C_8$ | $C_{12}$ | $C_{16}$ |
|---|---|---|---|---|---|---|
| Convent. Cat. | 1 | 0.0 | 0.0 | 29.7 | 13.0 | 0.4 |
| Invention Cat. | 1 | 0.0 | 0.0 | 42.5 | 4.8 | 0.0 |
| Convent. Cat. | 25 | 0.1 | 0.0 | 38.4 | 7.5 | 0.0 |
| Invention Cat. | 25 | 0.0 | 0.0 | 45.7 | 2.9 | 0.0 |

From the above values it is apparent that the stability over time of the catalyst of the invention is comparable to that of the conventional catalyst, whereas the selectivity has been substantially improved.

EXAMPLE 4

A commercially available silica/alumina preparation (molar ratio $SiO_2/Al_2O_3$ of 25:1) and a product of the invention according to Example 1 was impregnated with $Pt(NH_3)_4Cl_2$ in the conventional manner so that both catalysts contained 1% of platinum. Subsequently, both catalysts were treated first with oxygen at 400° C. for 1 hour and then with hydrogen at 400° C. for 1 hour. The reaction conditions of hydrocracking were as follows:

| | |
|---|---|
| Hydrogen | 0.7 MPa |
| n-Heptadecane | 0.7 kPa |
| WHSV (space velocity) | 0.3/h |

The results are listed in the following Table II.

TABLE II

| | Catalyst of Invention | Comparative Catalyst |
|---|---|---|
| | (Reaction Temperature) | |
| 20% Conversion | 220° C. | 274° C. |
| 80% Conversion | 258° C. | 277° C. |

It is apparent that with the catalyst of the present invention the conversion of n-heptedecane is higher with increasing reaction temperature.

The selectivity with respect to isomerization will be apparent from the following data:

The maximum yield of n-$C_{17}$ isomers with use of the catalyst of the invention was 62.6%. The yield of degradation products was 14.5%. Upon use of the catalyst of the prior art the maximum yield of n-$C_{17}$ isomers was 60.6%, and the yield of degradation products was 24.9%.

Both of the catalysts showed only a low amount of admixed low molecular weight degradation products having only 1 and 2 carbon atoms.

What is claimed is:

1. Amorphous, substantially spherical silica particles obtained by acidic hydrolysis of substantially spherical synthetic crystalline calcium silicates having a size of from 20 to 120 microns, characterized in that they are coated with a layer comprising silica and alumina.

2. Silica particles according to claim 1, wherein the atomic ratio of Si:Al is from 5:1 to 35:1.

3. Silica particles according to claim 1, wherein the atomic ratio of Si:Al is 8:1 to 30:1.

4. Silica particles according to claim 1, wherein the specific surface area is from 250 to 800 m²/g.

5. Silica particles according to claim 2, wherein the specific surface area is 350 to 600 m²/g.

6. A process for preparing substantially spherical silica particles obtained by the acidic hydrolysis of substantially spherical synthetic crystalline calcium silicates having a size of from 20 to 120 microns, characterized in that the calcium silicates are hydrolyzed in the pH range of from 0.6 to 5 using an acid which does not form a sparingly soluble calcium salt, a reactive aluminum compound is added to the reaction mixture, the reaction is allowed to proceed and the insoluble silica particles are collected.

7. Catalysts for oligomerizations of olefins and hydrocracking of paraffins, consisting of silica particles of claim 1.

* * * * *